United States Patent
Chen et al.

(10) Patent No.: US 11,057,813 B2
(45) Date of Patent: Jul. 6, 2021

(54) METHOD AND APPARATUS FOR TRANSMITTING DOWNLINK DATA

(71) Applicant: CHINA ACADEMY OF TELECOMMUNICATIONS TECHNOLOGY, Beijing (CN)

(72) Inventors: Shanzhi Chen, Beijing (CN); Hucheng Wang, Beijing (CN); Ming Ai, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/960,779

(22) PCT Filed: Nov. 26, 2018

(86) PCT No.: PCT/CN2018/117535
§ 371 (c)(1),
(2) Date: Jul. 8, 2020

(87) PCT Pub. No.: WO2019/134464
PCT Pub. Date: Jul. 11, 2019

(65) Prior Publication Data
US 2020/0344656 A1 Oct. 29, 2020

(30) Foreign Application Priority Data
Jan. 8, 2018 (CN) .......................... 201810016087.X

(51) Int. Cl.
*H04W 36/14* (2009.01)
*H04W 76/12* (2018.01)
(Continued)

(52) U.S. Cl.
CPC ....... *H04W 36/14* (2013.01); *H04W 36/0033* (2013.01); *H04W 76/12* (2018.02); *H04W 76/32* (2018.02)

(58) Field of Classification Search
CPC . H04W 36/14; H04W 36/0033; H04W 76/32; H04W 76/12
See application file for complete search history.

(56) References Cited

U.S. PATENT DOCUMENTS

| 10,524,166 | B2 * | 12/2019 | Youn ..................... H04W 36/14 |
| 2017/0034749 | A1 | 2/2017 | Chandramouli et al. |
| 2018/0192337 | A1 * | 7/2018 | Ryu ................... H04W 36/0066 |

FOREIGN PATENT DOCUMENTS

| CN | 104754668 A | 7/2015 |
| CN | 106465080 A | 2/2017 |
| CN | 106559868 A | 4/2017 |

OTHER PUBLICATIONS

International Search Report and Written Opinion issued by the International Searching Authority (ISA/CN in PCT Application No. PCT/CN2018/117535 dated Feb. 27, 2019. 11 pages, including English translation.
(Continued)

*Primary Examiner* — Saumit Shah
(74) *Attorney, Agent, or Firm* — Meunier Carlin & Curfman LLC

(57) ABSTRACT

The present application discloses a method and an apparatus for transmitting downlink data, to resolve the issue of erroneous transmission of downlink data of UE when the UE moves from an EPS network to a 5G network. The method comprises: after receiving a request message for updating a session management context of the UE, a session management function entity in embodiments of the present application determining that the UE has moved from a first network to a second network; the session management
(Continued)

function entity notifying a user plane function entity to delete a user plane connection of the UE in the first network, and creating a user plane connection of the UE in the second network, such that the user plane function entity transmits downlink data of the UE through the newly created user plane connection.

12 Claims, 6 Drawing Sheets

(51) Int. Cl.
  *H04W 76/32* (2018.01)
  *H04W 36/00* (2009.01)

(56) References Cited

OTHER PUBLICATIONS

Qualcomm Incorporated. "OI#25: TS 23.502: Security Handling for EPC-5GC Interworking with N26." SA WG2 Meeting #124, S2-178286, Dec. 1, 2017. 12 pages.

Nokia et al. "23.502: OI#13—5GS Registration Procedure at Mobility between EPS and 5GS with Existing 5GC Non-3GPP PDU Session." SA WG2 Meeting #124, S2-179237, Dec. 1, 2017. 20 pages.

Ericsson. "Editorial Corrections and Alignment." SA WG2 Meeting #124, S2-179097, Dec. 1, 2017. 198 pages.

CATT. "TS23.502: Handover Procedure from 5GS to EPS for Dual Registration Mode." SA WG2 Meeting #121, S2-173223, May 19, 2017. 4 pages.

SA WG2 Meeting #120, S2-172154, Mar. 27-31, 2017, Busan, Korea, ZTE, TS 23.502 P-CR to handover from EPS to NGS (Retrieved on Mar. 26, 2017).

SA WG2 Meeting #122BIS, S2-175483, Aug. 21-25, 2017, Sophia Antipolis, France, China Mobile, CATT, CATR, China Unicom, China Telecom, Huawei, ZTE, OPP, vivo; Clarifications for HO procedure from 5GS to EPC with SR UE using N26 (Retrieved on Aug. 21, 2017).

* cited by examiner

METHOD AND APPARATUS FOR TRANSMITTING DOWNLINK DATA

CROSS REFERENCE TO RELATED APPLICATIONS

The present application is a U.S. National Stage of International Application No. PCT/CN2018/117535, filed Nov. 26, 2018, which claims priority to Chinese Patent Application No. 201810016087.X, filed with the Chinese Patent Office on Jan. 8, 2018 and entitled "METHOD AND APPARATUS FOR TRANSMITTING DOWNLINK DATA", both of which are hereby incorporated by reference in their entireties.

FIELD OF INVENTION

The present application relates to the field of wireless communication technologies, and particularly to a method and apparatus for transmitting downlink data.

BACKGROUND

In a Long Term Evolution (LTE) network, as long as the Serving GateWay (SGW) changes in the Tracking Area Update (TAU) process, the source-side Mobility Management Entity (MME) will request the original SGW to only delete the Evolved Packet System (EPS) bearer locally but cannot send a request to delete the Packet Data Network (PDN) connection to the PDN GateWay (PGW) after the TAU is completed. However, the Evolved Packet Core (EPC) uses the transmission tunnel with the EPS bearing granularity while the 5G uses the tunnel with the Protocol Data Unit (PDU) session granularity, where there is no one-to-one correspondence between the granularities of two kinds of tunnels, so the PGW cannot directly map the tunnel allocated for the EPS bearer to the PDU session after a User Equipment (UE) updates the registration from 4G to 5G.

For an idle UE, in the condition that the UE moves from the EPS network to the 5G network, the mobility registration process will be triggered. Since the source-side MME requests the original SGW to only delete the EPS bearer locally, the SGW and the PGW still remain the tunnel allocated for the EPS bearer. After receiving the downlink data of the UE, the user plane function entity sends the downlink data to the session management function entity; and the session management function entity will still forward the downlink data of the UE to the SGW, thereby causing the error of the downlink data transmission of the UE.

In summary, at present, in the condition that a UE moves from the EPS network to the 5th-Generation (5G) mobile communication technology network, the error of the downlink data transmission of the UE may be caused.

BRIEF SUMMARY

The present application provides a method and apparatus for transmitting downlink data, so as to solve the problem in the prior art that the error of the downlink data transmission of a UE may be caused in the condition that the UE moves from the EPS network to the 5G network.

Based on the above problem, an embodiment of the present application provides a method for transmitting downlink data, including:

determining, by a session management function entity, that a UE moves from a first network to a second network after receiving a request message for updating session management context of the UE;

notifying, by the session management function entity, a user plane function entity to delete a user plane connection of the UE in the first network and create a user plane connection of the UE in the second network, so that the user plane function entity transmits downlink data of the UE through the user plane connection created in the second network.

Optionally, the method further includes:

determining, by the session management function entity, that a tunnel type used by the user plane connection in the second network is different from a tunnel type used by the user plane connection in the first network after the session management function entity determines that the UE moves from the first network to the second network and before the session management function entity notifies the user plane function entity to delete the user plane connection of the UE in the first network and create the user plane connection of the UE in the second network.

Optionally, the first network is an EPS network and the second network is a 5G network.

Optionally, determining, by the session management function entity, that the UE moves from the first network to the second network, includes:

determining, by the session management function entity, that the UE moves from the first network to the second network after receiving the request message sent by an Access and Mobility Management Function (AMF) entity; or determining, by the session management function entity, that the UE moves from the first network to the second network according to an EPS bearer identifier sent by the AMF entity.

Optionally, the method further includes:

determining, by the session management function entity, that the second network does not support the tunnel type used by the user plane connection in the first network before the session management function entity notifies the user plane function entity to delete the user plane connection of the UE in the first network; or receiving, by the session management function entity, a first indication message for indicating to delete the user plane connection of the UE in the first network sent by an AMF entity before the session management function entity notifies the user plane function entity to delete the user plane connection of the UE in the first network; or receiving, by the session management function entity, a second indication message for indicating to delete the user plane connection of the UE in the first network sent by an SGW before the session management function entity notifies the user plane function entity to delete the user plane connection of the UE in the first network; wherein the second indication message is sent by the SGW according to an indication of an MME.

In a second aspect, an embodiment of the present application further provides a session management function entity including a processor and a memory;

wherein the processor is configured to read a program in the memory to:

determine that a UE moves from a first network to a second network after receiving a request message for updating the session management context of the UE; and notify a user plane function entity to delete a user plane connection of the UE in the first network and notify the user plane function entity to create a user plane connection of the UE in the second network, so that the user plane function entity transmits the downlink data of the UE through the user plane connection created in the second network.

Optionally, the processor is further configured to:

determine that a tunnel type used by the user plane connection in the second network is different from a tunnel type used by the user plane connection in the first network after determining that the UE moves from the first network to the second network and before notifying the user plane function entity to delete the user plane connection of the UE in the first network and notifying the user plane function entity to create the user plane connection of the UE in the second network.

Optionally, the first network is an EPS network and the second network is a 5G network.

Optionally, the processor is further configured to:

determine that the UE moves from the first network to the second network after receiving the request message sent by an AMF entity; or determine that the UE moves from the first network to the second network according to an EPS bearer identifier sent by the AMF entity.

Optionally, the processor is further configured to:

determine that the second network does not support a tunnel type used by the user plane connection in the first network before notifying the user plane function entity to delete the user plane connection of the UE in the first network; or receive a first indication message for indicating to delete the user plane connection of the UE in the first network sent by an AMF entity before notifying the user plane function entity to delete the user plane connection of the UE in the first network; or receive a second indication message for indicating to delete the user plane connection of the UE in the first network sent by an SGW before notifying the user plane function entity to delete the user plane connection of the UE in the first network; wherein the second indication message is sent by the SGW according to an indication of a Mobility Management Entity, MME.

In a third aspect, an embodiment of the present application further provides a session management function entity, including:

a determining module configured to determine that a UE moves from a first network to a second network after receiving a request message for updating the session management context of the UE;

a notification module configured to notify a user plane function entity to delete a user plane connection of the UE in the first network and notify a user plane function entity to create a user plane connection of the UE in the second network, so that the user plane function entity transmits downlink data of the UE through the user plane connection created in the second network.

In a fourth aspect, an embodiment of the present application provides a computer storage medium storing a computer program thereon, where the computer program is executed by a processor to perform the method for transmitting downlink data.

In the embodiments of the present application, the session management function entity determines that the UE moves from the first network to the second network after receiving the request message for updating the session management context of the UE, notifies the user plane function entity to delete the user plane connection of the UE in the first network, and notifies the user plane function entity to create the user plane connection of the UE in the second network, so that the session management function entity receives the downlink data of the UE and then transmits the downlink data through the user plane connection in the second network, to avoid from transmitting the downlink data of the UE through the user plane connection in the first network, ensure the accurate transmission of the downlink data of the UE, and further improve the system performance.

BRIEF DESCRIPTION OF THE DRAWINGS

In order to illustrate the technical solutions in the embodiments of the present application more clearly, the accompanying figures which need to be used in describing the embodiments will be introduced below briefly. Obviously the accompanying figures described below are only some embodiments of the present application, and other accompanying figures can also be obtained by those ordinary skilled in the art according to these accompanying figures without creative labor.

DETAILED DESCRIPTION OF THE EMBODIMENTS

In the following, some terms in the embodiments of the present application are explained so as to facilitate the understanding of those skilled in the art.

(1) In the embodiments of the present application, the nouns "network" and "system" are often used alternately, but those skilled in the art may understand the meaning thereof.

(2) The term "a plurality of" in the embodiments of the present application refers to two or more, and other quantifiers are similar thereto.

(3) The term "and/or" describes the association relationship of the associated objects, and indicates that there may be three relationships, for example, A and/or B may represent: only A, both A and B, or only B. The character "/" generally indicates that the associated objects have a kind of "or" relationship.

In order to make the objects, technical solutions and advantages of the present application clearer, the present application will be further illustrated below in details with reference to the accompanying figures. Obviously the described embodiments are merely a part of the embodiments of the present application but not all the embodiments. Based upon the embodiments of the present application, all of other embodiments obtained by those ordinary skilled in the art without creative work pertain to the protection scope of the present application.

Figure 1:
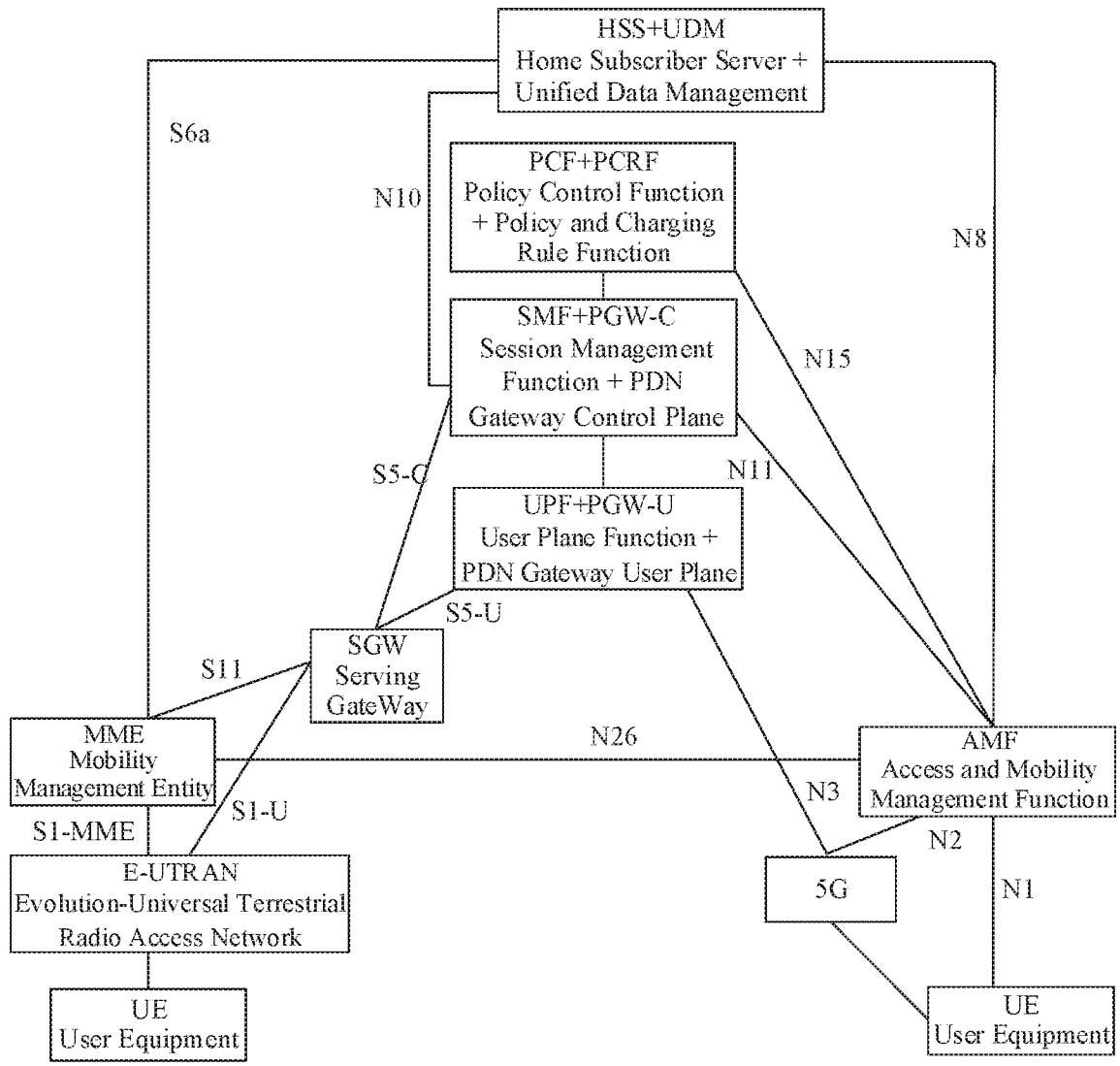
FIG. 1 is a schematic diagram of a network architecture of the embodiments of the present application.

As shown in FIG. 1, a network architecture supporting the interoperability of the 5G network and the EPS network of an embodiment of the present application is provided. The N26 interface between the AMF entity in the 5G network and the MME is optionally supported. When the network supports the Nx interface, the network can support the switching between the 5G and EPS networks. At this time, the context information (including the mobility context and the context of the session connection) of the UE needs to be transmitted between the MME and AMF entity. When a UE accesses such a network that supports the N26 interface, the network may configure its registration mode as single registration mode.

Figure 2:
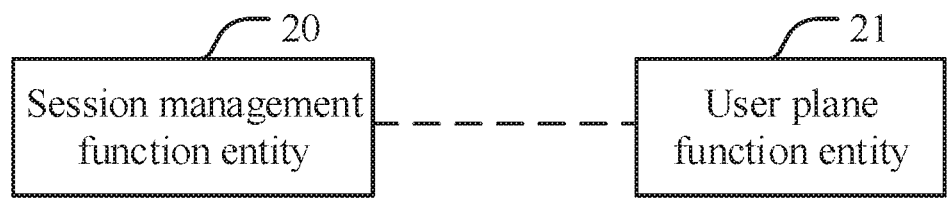
FIG. 2 is a structural schematic diagram of a system for transmitting downlink data of the embodiments of the present application.

As shown in FIG. 2, a system for transmitting downlink data of an embodiment of the present application includes:

a session management function entity 20, configured to determine that a UE moves from a first network to a second network after receiving a request message for updating the session management context of the UE; and notify a user plane function entity to delete a user plane connection of the UE in the first network and create a user plane connection of the UE in the second network, so that the user plane function entity transmits the downlink data of the UE through the user plane connection created in the second network;

a user plane function entity 21, configured to delete the user plane connection of the UE in the first network and create the user plane connection of the UE in the second network after receiving the notification of the session management function entity.

In the embodiments of the present application, the session management function entity determines that the UE moves from the first network to the second network after receiving the request message for updating the session management context of the UE, notifies the user plane function entity to delete the user plane connection of the UE in the first network, and notifies the user plane function entity to create the user plane connection of the UE in the second network, so that the session management function entity receives the downlink data of the UE and then transmits the downlink data through the user plane connection in the second network, to avoid from transmitting the downlink data of the UE through the user plane connection in the first network, ensure the accurate transmission of the downlink data of the UE, and further improve the system performance.

Optionally, in the embodiment of the present application, after determining that the UE switches from the first network to the second network, the session management function entity further needs to determine whether the tunnel types used by the user plane connections in the second network and the first network are same.

If the tunnel types used by the user plane connections in the second network and the first network are different, the session management function entity notifies the user plane function entity to delete the user plane connection of the UE in the first network and create the user plane connection of the UE in the second network.

If the tunnel types used by the user plane connections in the second network and the first network are same, the user plane connection in the first network may be switched into the second network.

It should be noted that the first network and the second network in the embodiments of the present application are two different networks.

In the following description, the first network is an EPS network and the second network is a 5G network in the embodiments of the present application.

Specifically, the embodiments of the present application provide two ways in which the session management function entity determines that the UE moves from the first network to the second network, which will be illustrated below respectively.

In a first way: the session management function entity determines that the UE moves from the first network to the second network after receiving the request message sent by an AMF entity.

Here, the request message is a request message sent by the AMF entity to update the session management context of the UE.

After the idle UE determines that it has moved from the EPS network to the 5G network, the UE sends a registration request message to the AMF entity.

Here, the UE may determine that it moves from the EPS network to the 5G network in the following ways.

The UE determines that it moves from the EPS network to the 5G network according to the received broadcast message of the wireless air interface.

The registration request message sent by the UE to the AMF entity carries the old Globally Unique Temporary UE Identity (GUTI); wherein the old GUTI is the 5G GUTI mapped from the 4G GUTI.

After receiving the registration request message, the AMF entity determines that the UE moves from the EPS network to the 5G network according to the old GUTI carried in the registration request message; and the AMF entity parses out the MME address from the old GUTI and obtains the context information of the UE from the MME.

The AMF entity determines the session management function entity that currently serves the UE according to the context information of the UE, and the AMF entity sends a request message to the session management function entity. The session management function entity can determine that the UE moves from the EPS network to the 5G network after receiving the request message sent by the AMF entity.

Specifically, the AMF entity invokes the update session management context service of the PDU session (Nsmf_PDUSession_UpdateSMContext), sends a request message to the session management function entity to request the session management function entity to update the session management context of the UE.

In a second way: the session management function entity determines that the UE moves from the first network to the second network according to an EPS bearer identifier sent by the AMF entity.

After the idle UE determines that it has moved from the EPS network to the 5G network, the UE sends a registration request message to the AMF entity.

Here, the UE may determine that it moves from the EPS network to the 5G network in the following ways.

The UE determines that it moves from the EPS network to the 5G network according to the received broadcast message of the wireless air interface.

The registration request message sent by the UE to the AMF entity carries the old GUTI; wherein the old GUTI is the 5G GUTI mapped from the 4G GUTI.

After receiving the registration request message, the AMF entity determines that the UE moves from the EPS network to the 5G network according to the old GUTI carried in the registration request message; and the AMF entity parses out the MME address from the old GUTI and obtains the context information of the UE from the MME.

The AMF entity determines the session management function entity that currently serves the UE according to the context information of the UE, and the AMF entity sends a message carrying the EPS bearer identifier to the session management function entity. The session management function entity can determine that the UE moves from the EPS network to the 5G network after receiving the EPS bearer identifier sent by the AMF entity.

It should be noted that the two above ways in which the session management function entity determines that the UE moves from the EPS network to the 5G network are only examples for illustrating the embodiments of the present application. The ways, in which the session management function entity determines that the UE moves from the EPS network to the 5G network, to be covered by the embodiments of the present application are not limited to the above examples, and any way in which the session management function entity can determine that the UE moves from the EPS network to the 5G network is applicable to the present application.

In the embodiments of the present application, the session management function entity may be triggered in the following ways to notify the user plane function entity to, delete the user plane connection of the UE in the EPS network and create the user plane connection of the UE in the 5G network. These cases will be illustrated below respectively.

In a first way: the session management function entity determines that the second network does not support the tunnel type used by the user plane connection in the first network.

After the session management function entity determines that the tunnel types used by the user plane connections in the EPS network and the 5G network are different, the session management function entity notifies the user plane function entity to delete the user plane connection of the UE in the EPS network and create the user plane connection of the UE in the 5G network if the session management function entity determines that the second network does not support the tunnel type used by the user plane connection in the first network.

In an implementation, after receiving the registration request message sent by the UE, the AMF entity determines the session management function entity serving the UE according to the context information of the UE.

After the AMF entity sends a request message to update the session management context of the UE to the session management function entity, the session management function entity determines that the UE moves from the EPS network to the 5G network. The session management function entity determines that the 5G network does not support the tunnel type used by the user plane connection in the EPS network, so the session management function entity notifies the user plane function entity to, delete the user plane connection of the UE in the EPS network and create the user plane connection of the UE in the 5G network.

Correspondingly, after receiving the notification of the session management function entity, the user plane function entity deletes the user plane connection of the UE in the EPS network, and creates the user plane connection of the UE in the 5G network.

Specifically, the session management function entity initiates the Sx session termination process and requests the user plane function entity to delete the user plane connection of the UE in the EPS network.

The session management function entity sends an N4 session establishment request message or N4 session modification request message to the user plane function entity serving the UE, where the message carries an indication for indicating the user plane function entity to create the user plane connection of the UE in the 5G network.

Here, optionally, the user plane function entity creates but does not activate a user plane tunnel of the PDU session in the 5G network, so that the user plane function entity can buffer the data packet and trigger the notification of downlink data arrival to the session management function entity in the condition that receiving the downlink data packet of the PDU session.

The following takes the first way as an example to illustrate the method for transmitting downlink data of the embodiments of the present application, wherein the session management function entity is represented by the Packet Data Network Gateway Control Plane+Session Management Function (PGW-C+SMF), and the user plane function entity is represented by the Packet Data Network Gateway User Plane+User Plane Function (PGW-U+UPF).

Figure 3:
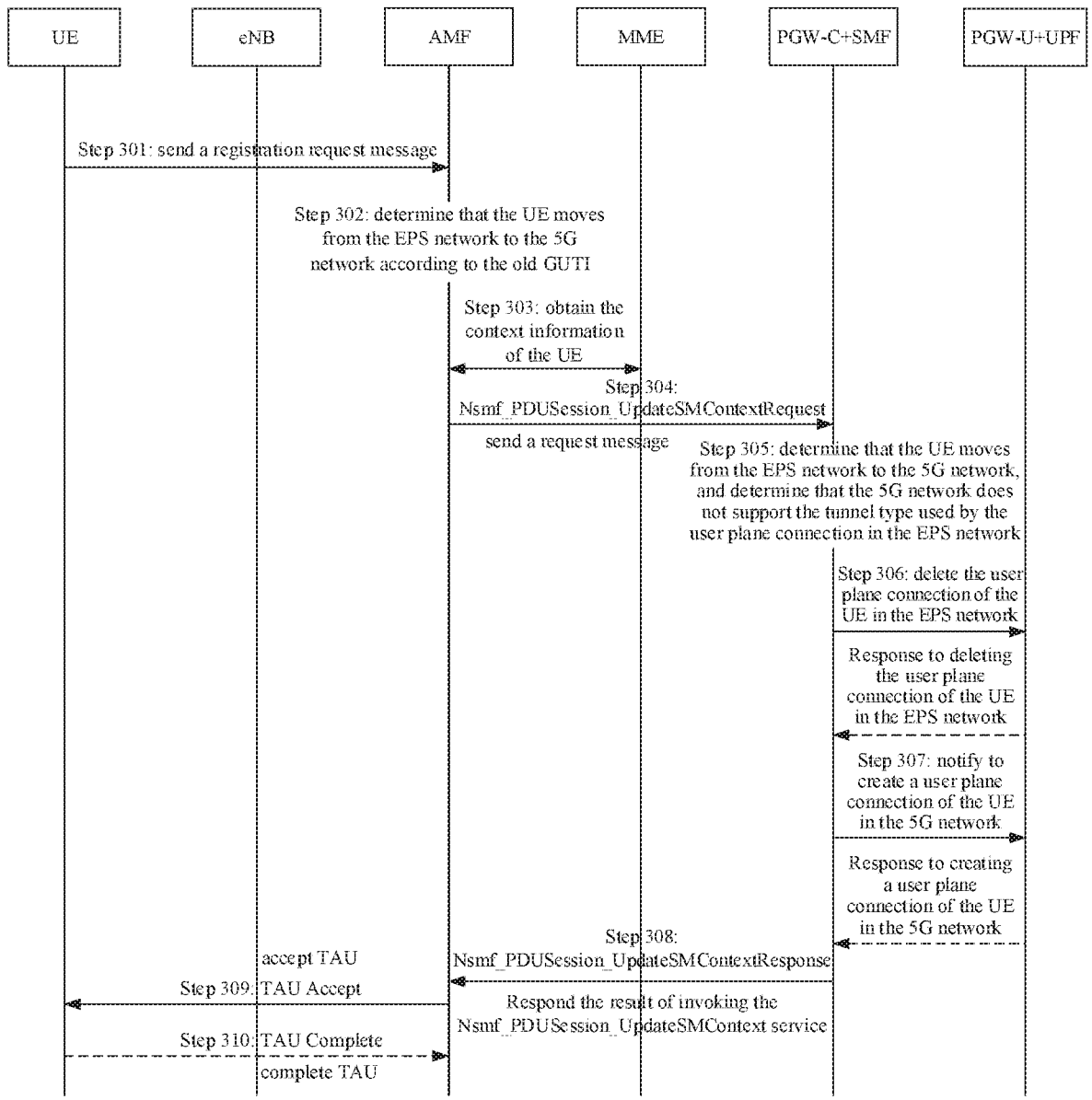
FIG. 3 is a first overall flowchart of the downlink data transmission of the embodiments of the present application.

As shown in FIG. 3, a UE in the idle state triggers the mobility registration process after determining that it moves from the EPS network to the 5G network.

Step 301: the UE sends a registration request message to the AMF entity.

Here, the registration request message carries the old GUTI, and the old GUTI is the 5G GUTI mapped from the 4G GUTI.

Step 302: the AMF entity determines that the UE moves from the EPS network to the 5G network according to the old GUTI and parses out the MME address from the old GUTI.

Step 303: the AMF entity obtains the context information of the UE from the MME.

Step 304: the AMF entity invokes the Nsmf_PDUSession_UpdateSMContext service and sends a request message to the PGW-C+SMF.

Here, the AMF entity determines the PGW-C+SMF serving the UE according to the context information of the UE, and this request message is used to notify the PGW-C+SMF to update the session management context of the UE.

Step 305: the PGW-C+SMF determines that the UE moves from the EPS network to the 5G network, and determines that the 5G network does not support the tunnel type used by the user plane connection in the EPS network.

Step 306: the PGW-C+SMF notifies the PGW-U+UPF to delete the user plane connection of the UE in the EPS network.

Here, the PGW-C+SMF initiates the Sx session termination process, and notifies the PGW-U+UPF to delete the user plane connection of the UE in the EPS network.

Step 307: the PGW-C+SMF notifies the PGW-U+UPF to create a user plane connection of the UE in the 5G network.

Here, the PGW-C+SMF sends an N4 session establishment request message or N4 session modification request message to the PGW-U+UPF serving the UE to notify the PGW-U+UPF to create the user plane connection of the UE in 5G network.

The PGW-U+UPF creates but does not activate a user plane tunnel of the PDU session in the 5G network, so that the PGW-U+UPF can buffer the data packet and trigger the notification of downlink data arrival to the PGW-C+SMF in the condition that receiving the downlink data packet of the PDU session.

Step 308: the PGW-C+SMF responds the result of invoking the Nsmf_PDUSession_UpdateSMContext service to the AMF entity.

Step 309 and step 310: the AMF entity and the UE complete the NAS signaling interactions and complete the registration process.

In a second way, the session management function entity receives a first indication message for indicating to delete the user plane connection of the UE in the first network sent by the AMF entity.

After the session management function entity determines that the tunnel types used by the user plane connections in the EPS network and the 5G network are different, the session management function entity notifies the user plane function entity to delete the user plane connection of the UE in the EPS network and notifies the user plane function entity to create the user plane connection of the UE in the 5G network if the session management function entity receives the first indication message for indicating to delete the user plane connection of the UE in the first network sent by the AMF entity.

In an implementation, after receiving the registration request message sent by the UE, the AMF entity determines the session management function entity serving the UE according to the context information of the UE.

Optionally, the first indication message for indicating to delete the user plane connection of the UE in the EPS network sent by the AMF entity to the session management function entity may be placed in the request message for updating the session management context of the UE; or the first indication message and the request message are the same message; or the first indication message and the request message are two independent messages.

Specifically, the AMF entity invokes the Nsmf_PDUSession_UpdateSMContext service and sends the request message and/or the first indication message to the session management function entity.

It should be noted that the first indication message is used to indicate the session management function entity to notify the user plane function entity to delete the user plane connection of the UE in the EPS network.

After receiving the first indication message for indicating to delete the user plane connection of the UE in the EPS network sent by the AMF entity, the session management function entity notifies the user plane function entity to delete the user plane connection of the UE in the EPS network and notifies the user plane function entity to create the user plane connection of the UE in the 5G network.

Correspondingly, after receiving the notification of the session management function entity, the user plane function entity deletes the user plane connection of the UE in the EPS network, and creates the user plane connection of the UE in the 5G network.

Specifically, the session management function entity initiates the Sx session termination process and requests the user plane function entity to delete the user plane connection of the UE in the EPS network.

The session management function entity sends an N4 session establishment request message or N4 session modification request message to the user plane function entity serving the UE, where the message carries an indication for indicating the user plane function entity to create the user plane connection of the UE in the 5G network.

Here, optionally, the user plane function entity creates but does not activate a user plane tunnel of the PDU session in the 5G network, so that the user plane function entity can buffer the data packet and trigger the notification of downlink data arrival to the session management function entity in the condition that receiving the downlink data packet of the PDU session.

The following takes the second way as an example to illustrate the method for transmitting downlink data of the embodiments of the present application, wherein the session management function entity is represented by the PGW-C+SMF, and the user plane function entity is represented by the PGW-U+UPF.

Figure 4:
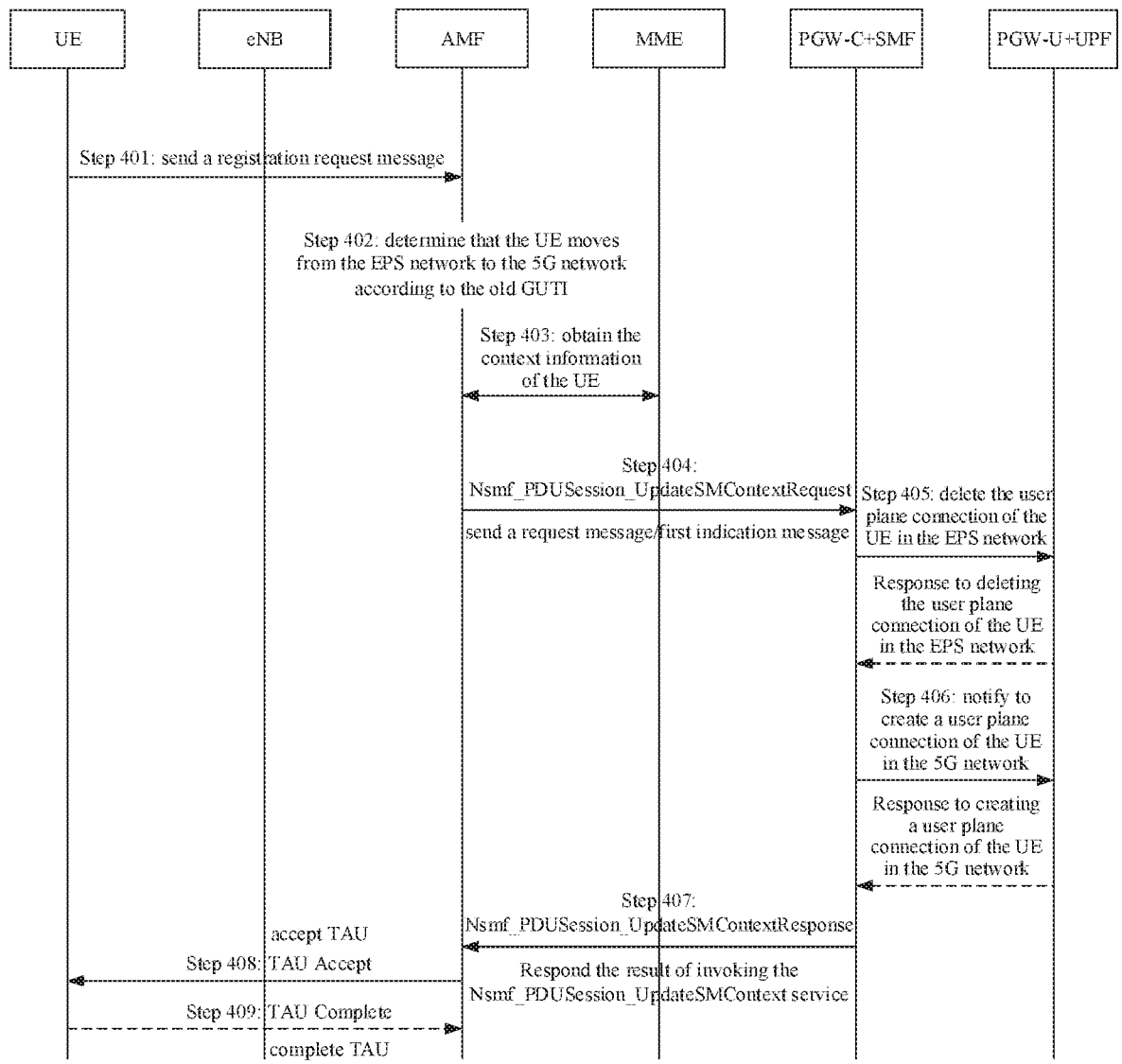
FIG. 4 is a second overall flowchart of the downlink data transmission of the embodiments of the present application.

As shown in FIG. 4, a UE in the idle state triggers the mobility registration process after determining that it moves from the EPS network to the 5G network.

Step 401: the UE sends a registration request message to the AMF entity.

Here, the registration request message carries the old GUTI, and the old GUTI is the 5G GUTI mapped from the 4G GUTI.

Step 402: the AMF entity determines that the UE moves from the EPS network to the 5G network according to the old GUTI and parses out the MME address from the old GUTI.

Step 403: the AMF entity obtains the context information of the UE from the MME.

Step 404: the AMF entity invokes the Nsmf_PDUSession_UpdateSMContext service and sends a request message to the PGW-C+SMF; and sends a first indication message for indicating to delete the user plane connection of the UE in the first network to the PGW-C+SMF.

Here, the first indication message and the request message may be the same message or two independent messages, or the first indication message is placed in the request message. The request message is used to notify the PGW-C+SMF to update the session management context of the UE, and the request message carries the EPS bearer identifier.

The AMF entity determines the PGW-C+SMF serving the UE according to the context information of the UE.

Step 405: the PGW-C+SMF determines that the UE moves from the EPS network to the 5G network, and the PGW-C+SMF notifies the PGW-U+UPF to delete the user plane connection of the UE in the EPS network.

Here, the PGW-C+SMF initiates the Sx session termination process, and notifies the PGW-U+UPF to delete the user plane connection of the UE in the EPS network.

Step 406: the PGW-C+SMF notifies the PGW-U+UPF to create a user plane connection of the UE in the 5G network.

Here, the PGW-C+SMF sends an N4 session establishment request message or an N4 session modification request message to the PGW-U+UPF serving the UE, where the N4 session establishment request message or the N4 session modification request message carries an indication for indicating the PGW-U+UPF to create the user plane connection of the UE in 5G network.

The PGW-U+UPF creates but does not activate a user plane tunnel of the PDU session in the 5G network, so that the PGW-U+UPF can buffer the data packet and trigger the notification of downlink data arrival to the PGW-C+SMF in the condition that receiving the downlink data packet of the PDU session.

Step 407: the PGW-C+SMF responds the result of invoking the Nsmf_PDUSession_UpdateSMContext service to the AMF entity.

Step 408 and step 409: the AMF entity and the UE complete the NAS signaling interactions and complete the registration process.

In a third way: the session management function entity receives a second indication message for indicating to delete the user plane connection of the UE in the first network sent by an SGW; wherein the second indication message is sent by the SGW according to the indication from an MME.

After the session management function entity determines that the tunnel types used by the user plane connections in the EPS network and the 5G network are different, the session management function entity notifies the user plane function entity to delete the user plane connection of the UE in the EPS network and notifies the user plane function entity to create the user plane connection of the UE in the 5G network if the session management function entity receives the second indication message for indicating to delete the user plane connection of the UE in the first network sent by the SGW.

In an implementation, after receiving the registration request message sent by the UE, the AMF entity determines that the UE moves from the EPS network to the 5G network according to the old GUTI carried in the registration request message. The AMF entity parses out the MME address from the old GUTI carried in the registration request message and obtains the context information of the UE from the MME.

The AMF entity determines the session management function entity serving the UE according to the context information of the UE.

The AMF entity sends a confirmation message to the MME after obtaining the context information of the UE from the MME.

Optionally, after receiving the confirmation message, the MME indicates the SGW to send the second indication message for indicating to delete the user plane connection of the UE in the EPS network to the session management function entity.

In an implementation, the confirmation message sent by the AMF entity to the MME carries the indication information, which is used for indicating the MME to set a delete session request message sent to the SGW so that the SGW sends the second indication message for indicating to delete the user plane connection of the UE in the EPS network to the session management function entity; or after receiving the confirmation message, the MME autonomously determines that there is a need to indicate the SGW to send the second indication message for indicating to delete the user plane connection of the UE in the EPS network to the session management function entity.

Specifically, the MME sets the operation indication as 1 in the delete session request message sent to the SGW; and after receiving the delete session request message, the SGW sends the second indication message for indicating to delete the user plane connection of the UE in the EPS network to the session management function entity according to the operation indication value.

It should be noted that the second indication message sent by the SGW to the session management function entity may also be the delete session request message in the embodiments of the present application.

It should be noted that, in the third way, the process in which the session management function entity notifies the user plane entity to delete the user plane connection of the UE in the EPS network and the process in which the session management function entity notifies the user plane entity to create the user plane connection of the UE in the 5G network may be triggered simultaneously or separately.

Here, after the session management function entity receives the second indication message for indicating to delete the user plane connection of the UE in the EPS network sent by the SGW, the session management function entity notifies the user plane entity to delete the user plane connection of the UE in the EPS network. After the session management function entity determines that the UE moves from the EPS network to the 5G network, the session management function entity notifies the user plane entity to create the user plane connection of the UE in the 5G network in the condition that the tunnel types of the user plane connections of the UE in the EPS network and the 5G network are different.

Or, after the session management function entity receives the second indication message for indicating to delete the user plane connection of the UE in the EPS network sent by the SGW, the session management function entity notifies the user plane function entity to delete the user plane connection of the UE in the EPS network and create the user plane connection of the UE in the 5G network.

Correspondingly, after receiving the notification of the session management function entity, the user plane function entity deletes the user plane connection of the UE in the EPS network, and creates the user plane connection of the UE in the 5G network.

Specifically, the session management function entity initiates the Sx session termination process and requests the user plane function entity to delete the user plane connection of the UE in the EPS network.

The session management function entity sends an N4 session establishment request message or N4 session modification request message to the user plane function entity serving the UE, where the message carries an indication for indicating the user plane function entity to create the user plane connection of the UE in the 5G network.

Here, optionally, the user plane function entity creates but does not activate a user plane tunnel of the PDU session in the 5G network, so that the user plane function entity can buffer the data packet and trigger the notification of downlink data arrival to the session management function entity in the condition that receiving the downlink data packet of the PDU session.

The following takes the third way as an example to illustrate the method for transmitting downlink data of the embodiments of the present application, wherein the session management function entity is represented by the PGW-C+SMF, and the user plane function entity is represented by the PGW-U+UPF.

Figure 5:
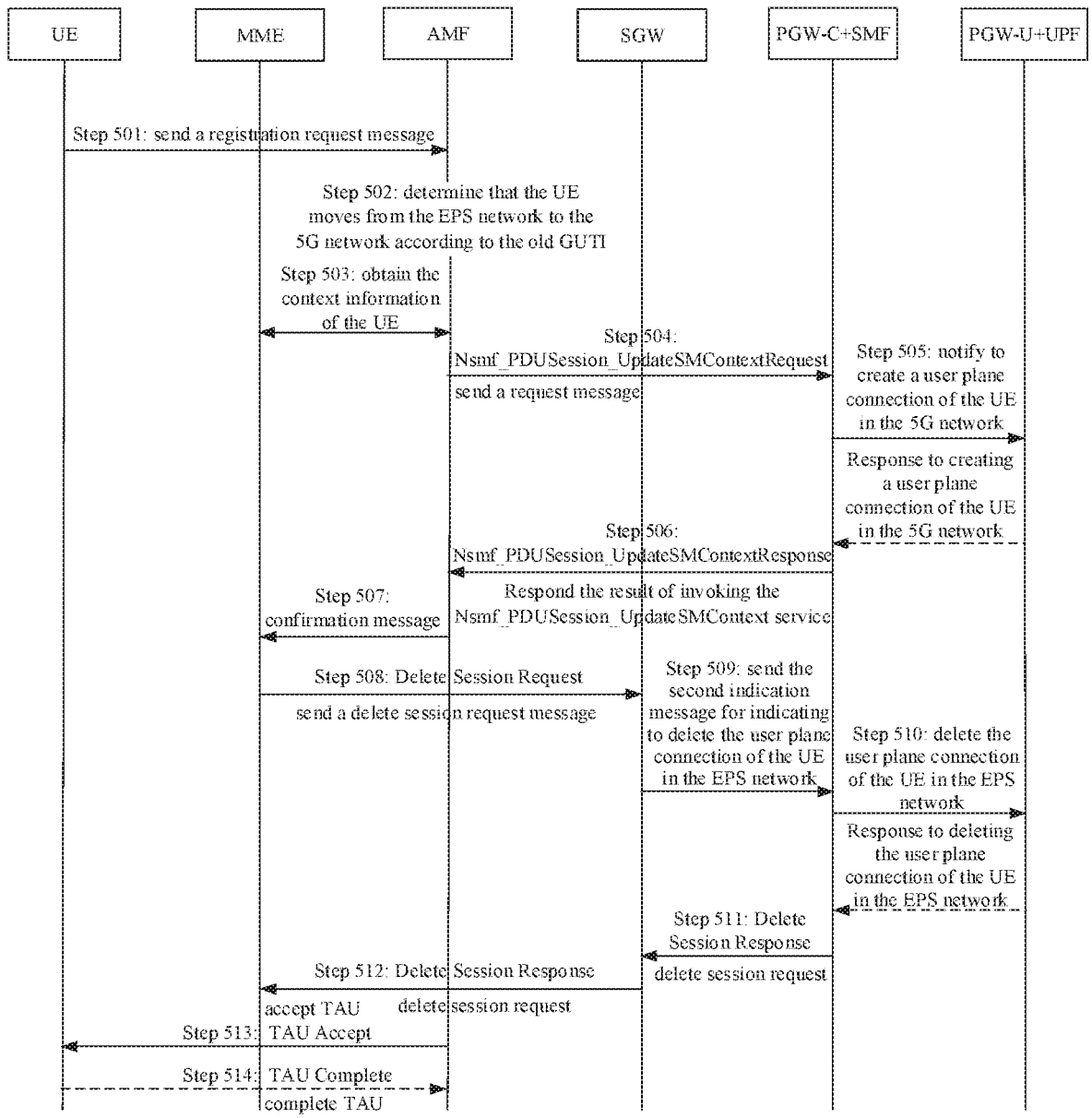
FIG. 5 is a third overall flowchart of the downlink data transmission of the embodiments of the present application.

As shown in FIG. 5, a UE in the idle state triggers the mobility registration process after determining that it moves from the EPS network to the 5G network.

Step 501: the UE sends a registration request message to the AMF entity.

Here, the registration request message carries the old GUTI, and the old GUTI is the 5G GUTI mapped from the 4G GUTI.

Step 502: the AMF entity determines that the UE moves from the EPS network to the 5G network according to the old GUTI and parses out the MME address from the old GUTI.

Step 503: the AMF entity obtains the context information of the UE from the MME.

Step 504: the AMF entity invokes the Nsmf_PDUSession_UpdateSMContext service and sends a request message to the PGW-C+SMF.

The request message is used to notify the PGW-C+SMF to update the session management context of the UE, and the request message carries the EPS bearer identifier.

The AMF entity determines the PGW-C+SMF serving the UE according to the context information of the UE.

Step 505: the PGW-C+SMF determines that the UE moves from the EPS network to the 5G network, and the PGW-C+SMF notifies the PGW-U+UPF to create the user plane connection of the UE in the 5G network.

Here, the PGW-C+SMF sends an N4 session establishment request message or an N4 session modification request message to the PGW-U+UPF serving the UE, where the N4 session establishment request message or the N4 session modification request message carries an indication for indicating the PGW-U+UPF to create the user plane connection of the UE in 5G network.

The PGW-U+UPF creates but does not activate a user plane tunnel of the PDU session in the 5G network, so that the PGW-U+UPF can buffer the data packet and trigger the notification of downlink data arrival to the PGW-C+SMF in the condition that receiving the downlink data packet of the PDU session.

Step 506: the PGW-C+SMF responds the result of invoking the Nsmf_PDUSession_UpdateSMContext service to the AMF entity.

Step 507: the AMF entity sends a confirmation message to the MME.

Here, this confirmation message carries the indication information, which is used for indicating the MME to set a delete session request message sent to the SGW so that the SGW sends the second indication message for indicating to delete the user plane connection of the UE in the EPS network to the PGW-C+SMF.

Or, this confirmation message contains no indication information. The MME determines that the UE moves from the EPS network to the 5G network after receiving the confirmation message. The MME autonomously sets the delete session request message sent to the SGW so that the SGW sends the second indication message for indicating to delete the user plane connection of the UE in the EPS network to the PGW-C+SMF.

Step 508: the MME sends a delete session request message to the SGW.

Specifically, the MME sets the operation indication as 1 in the delete session request message sent to the SGW; and after receiving the delete session request message, the SGW sends the second indication message for indicating to delete the user plane connection of the UE in the EPS network to the PGW-C+SMF according to the operation indication value.

Step 509: the SGW sends the second indication message for indicating to delete the user plane connection of the UE in the EPS network to the PGW-C+SMF.

Here, the indication request message may be the delete session request message.

Step 510: the PGW-C+SMF notifies the PGW-U+UPF to delete the user plane connection of the UE in the EPS network.

Here, the PGW-C+SMF initiates the Sx session termination process, and notifies the PGW-U+UPF to delete the user plane connection of the UE in the EPS network.

Step 511: the PGW-C+SMF returns a delete session response to the SGW.

Step 512: the SGW returns the delete session response to the MME.

Step 513 and step 514: the AMF entity and the UE complete the NAS signaling interactions and complete the registration process.

It should be noted that there is no sequential order between steps 505-506 and steps 507-512.

Figure 6:
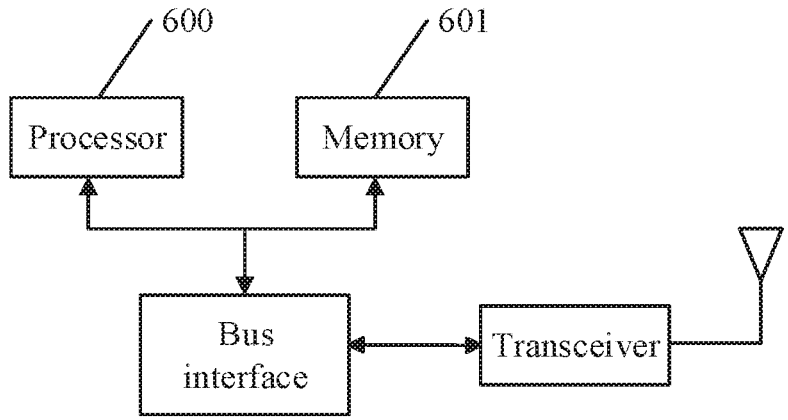
FIG. 6 is a structural schematic diagram of a first session management function entity of the embodiments of the present application.

As shown in FIG. 6, a first session management function entity of an embodiment of the present application includes a processor 600 and a memory 601;

wherein the processor 600 is configured to read a program in the memory to:

determine that a UE moves from a first network to a second network after receiving a request message for updating the session management context of the UE; and notify a user plane function entity to delete a user plane connection of the UE in the first network and notify the user plane function entity to create a user plane connection of the UE in the second network, so that the user plane function entity transmits the downlink data of the UE through the user plane connection created in the second network.

Optionally, the processor 600 is further configured to:

determine that a tunnel type used by the user plane connection in the second network is different from a tunnel type used by the user plane connection in the first network after determining that the UE moves from the first network to the second network and before notifying the user plane function entity to delete the user plane connection of the UE in the first network and notifying the user plane function entity to create the user plane connection of the UE in the second network.

Optionally, the first network is an EPS network and the second network is a 5G network.

Optionally, the processor 600 is further configured to:

determine that the UE moves from the first network to the second network after receiving the request message sent by an AMF entity; or determine that the UE moves from the first network to the second network according to an EPS bearer identifier sent by the AMF entity.

Optionally, the processor 600 is further configured to:

determine that the second network does not support the tunnel type used by the user plane connection in the first network before notifying the user plane function entity to delete the user plane connection of the UE in the first network; or receive a first indication message for indicating to delete the user plane connection of the UE in the first network sent by the AMF entity before notifying the user plane function entity to delete the user plane connection of the UE in the first network; or receive a second indication message for indicating to delete the user plane connection of the UE in the first network sent by an SGW before notifying the user plane function entity to delete the user plane connection of the UE in the first network; wherein the second indication message is sent by the SGW according to an indication of an MME.

The bus architecture may include any numbers of interconnected buses and bridges. Specifically various circuits of one or more processors represented by the processor 600 and of the memory represented by the memory 601 are linked together. The bus architecture may further link various other circuits such as peripheral device, voltage regulator and power management circuit, which are all well known in the art and thus will not be further described again herein. The bus interface provides an interface. The processor 600 is responsible for managing the bus architecture and general processing, and the memory 601 may store the data used by the processor 600 in the condition that performing the operations.

The procedure disclosed by the embodiment of the present application may be applied in the processor 600 or implemented by the processor 600. In the implementation process, each step of the signal processing flow may be completed by the integrated logic circuit of hardware in the processor 600 or the indication in the form of software. The processor 600 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like.

The steps of the method disclosed in combination with the embodiments of the present application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 601, and the processor 600 reads the information in the memory 601 and completes the steps of the signal processing flow in combination with its hardware.

Figure 7:
FIG. 7 is a structural schematic diagram of a second session management function entity of the embodiments of the present application.

As shown in FIG. 7, a second session management function entity of an embodiment of the present application includes:

a determining module 700 configured to determine that a UE moves from a first network to a second network after receiving a request message for updating the session management context of the UE;

a notification module 701 configured to notify a user plane function entity to delete a user plane connection of the UE in the first network and notify the user plane function entity to create a user plane connection of the UE in the second network, so that the user plane function entity transmits the downlink data of the UE through the user plane connection created in the second network.

Optionally, the determining module 700 is further configured to:

determine that a tunnel type used by the user plane connection in the second network is different from a tunnel type used by the user plane connection in the first network after determining that the UE moves from the first network to the second network and before notifying the user plane function entity to delete the user plane connection of the UE in the first network and notifying the user plane function entity to create the user plane connection of the UE in the second network.

Optionally, the first network is an EPS network and the second network is a 5G network.

Optionally, the determining module 700 is further configured to:

determine that the UE moves from the first network to the second network after receiving the request message sent by an AMF entity; or determine that the UE moves from the first network to the second network according to an EPS bearer identifier sent by the AMF entity.

Optionally, the notification module 701 is further configured to:

determine that the second network does not support the tunnel type used by the user plane connection in the first network before notifying the user plane function entity to delete the user plane connection of the UE in the first network; or receive a first indication message for indicating to delete the user plane connection of the UE in the first network sent by the AMF entity before notifying the user plane function entity to delete the user plane connection of the UE in the first network; or receive a second indication message for indicating to delete the user plane connection of the UE in the first network sent by the SGW before notifying the user plane function entity to delete the user plane connection of the UE in the first network; wherein the second indication message is sent by the SGW according to an indication of an MME.

An embodiment of the present application provides a readable storage medium, which is a non-volatile readable storage medium and includes the program codes which are configured, in the condition that running on a computer, to cause the computer to perform the above-mentioned actions of the session management function entity transmitting the downlink data.

Based upon the same inventive concept, an embodiment of the present application further provides a method for transmitting downlink data. Since the device corresponding to this method is the session management function entity in the system for transmitting downlink data of the embodiments of the present application and the principle solving the problem of this method is similar to that of the device, the implementations of this method may refer to the implementations of the device, and the repeated description thereof will be omitted here.

Figure 8:
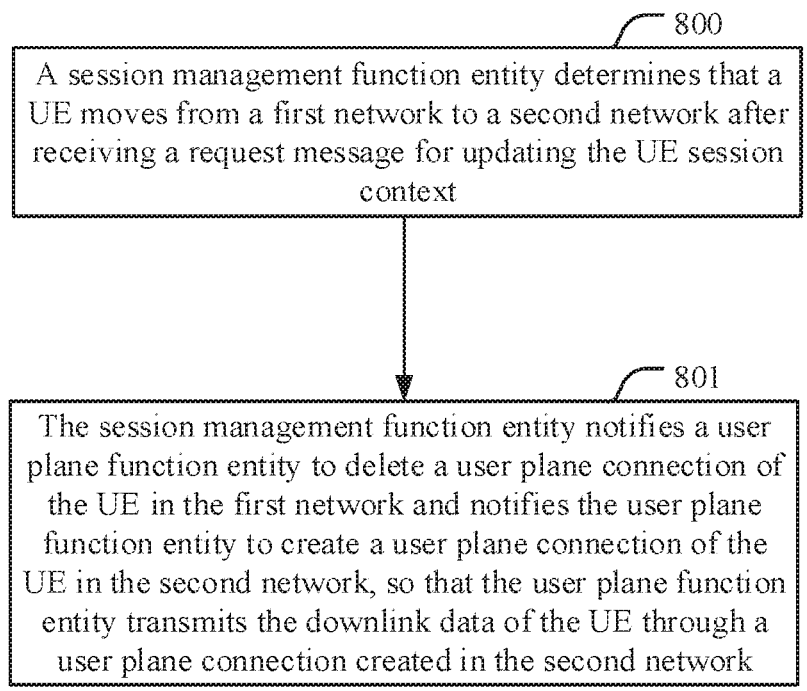
FIG. 8 is a flow chart of a method for transmitting downlink data of the embodiments of the present application.

As shown in FIG. 8, a method for transmitting downlink data of an embodiment of the present application includes the following steps.

Step 800: a session management function entity determines that a UE moves from a first network to a second network after receiving a request message for updating the session management context of the UE.

Step 801: the session management function entity notifies a user plane function entity to delete a user plane connection of the UE in the first network and notifies the user plane function entity to create a user plane connection of the UE in the second network, so that the user plane function entity transmits the downlink data of the UE through the user plane connection created in the second network.

Optionally, the method further includes:

the session management function entity determines that a tunnel type used by the user plane connection in the second network is different from a tunnel type used by the user plane connection in the first network after the session management function entity determines that a UE moves from a first network to a second network and before the session management function entity notifies a user plane function entity to delete a user plane connection of the UE in the first network and notifies the user plane function entity to create a user plane connection of the UE in the second network.

Optionally, the first network is an EPS network and the second network is a 5G network.

Optionally, the session management function entity determines that a UE moves from a first network to a second network, which includes:

the session management function entity determines that the UE moves from the first network to the second network after receiving the request message sent by an AMF entity; or the session management function entity determines that the UE moves from the first network to the second network according to an EPS bearer identifier sent by the AMF entity.

Optionally, before the session management function entity notifies a user plane function entity to delete a user plane connection of the UE in the first network, the method further includes:

the session management function entity determines that the second network does not support the tunnel type used by the user plane connection in the first network; or the session management function entity receives a first indication message for indicating to delete the user plane connection of the UE in the first network sent by the AMF entity; or the session management function entity receives a second indication message for indicating to delete the user plane connection of the UE in the first network sent by an SGW; wherein the second request message is sent by the SGW according to an indication of an MME.

The present application has been described above by reference to the block diagrams and/or flow charts showing the methods, devices (systems) and/or computer program products according to the embodiments of the present application. It should be understood that one block shown in the block diagrams and/or flow charts and a combination of the blocks shown in the block diagrams and/or flow charts can be implemented by the computer program indications.

These computer program indications can be provided to a general-purpose computer, a processor of a dedicated computer and/or another programmable data processing unit to produce a machine, so that the indications executed by the computer processor and/or another programmable data processing unit create the methods for implementing the functions and/or actions specified in the blocks of the block diagrams and/or flow charts.

Accordingly, the present application can also be implemented by the hardware and/or software (including the firmware, resident software, microcode and the like). Further, the present application can adopt the form of computer program products on the computer usable or computer readable storage medium, which has the computer usable or computer readable program codes implemented in the medium, to be used by the indication execution system or used in combination with the indication execution system. In the context of the present application, the computer usable or computer readable storage medium can be any medium, which can contain, store, communicate with, transmit or transfer the programs, to be used by the indication execution system, apparatus or device, or used in combination with the indication execution system, apparatus or device.

Evidently those skilled in the art can make various modifications and variations to the present application without departing from the spirit and scope of the present application. Thus the present application is also intended to encompass these modifications and variations therein as long as these modifications and variations to the present application come into the scope of the claims of the present application and their equivalents.

What is claimed is:

1. A method for transmitting downlink data, comprising:
   determining, by a session management function entity, that a User Equipment, UE, moves from a first network to a second network after receiving a request message for updating session management context of the UE;
   notifying, by the session management function entity, a user plane function entity to delete a user plane connection of the UE in the first network and create a user plane connection of the UE in the second network, so that the user plane function entity transmits downlink data of the UE through the user plane connection created in the second network; and
   determining, by the session management function entity, that a tunnel type used by the user plane connection in the second network is different from a tunnel type used by the user plane connection in the first network after the session management function entity determines that the UE moves from the first network to the second network and before the session management function entity notifies the user plane function entity to delete the user plane connection of the UE in the first network and create the user plane connection of the UE in the second network.

2. The method of claim 1, wherein the first network is an Evolved Packet System, EPS, network and the second network is a 5G network.

3. The method of claim 2, wherein the determining, by the session management function entity, that the UE moves from the first network to the second network, comprises:
   determining, by the session management function entity, that the UE moves from the first network to the second network after receiving the request message sent by an Access and Mobility Management Function, AMF entity; or
   determining, by the session management function entity, that the UE moves from the first network to the second network according to an EPS bearer identifier sent by the AMF entity.

4. The method of claim 2, wherein the method further comprises:
   determining, by the session management function entity, that the second network does not support a tunnel type used by the user plane connection in the first network before the session management function entity notifies the user plane function entity to delete the user plane connection of the UE in the first network; or
   receiving, by the session management function entity, a first indication message for indicating to delete the user plane connection of the UE in the first network sent by an AMF entity before the session management function entity notifies the user plane function entity to delete the user plane connection of the UE in the first network; or
   receiving, by the session management function entity, a second indication message for indicating to delete the user plane connection of the UE in the first network sent by a Serving GateWay, SGW, before the session management function entity notifies the user plane function entity to delete the user plane connection of the UE in the first network; wherein the second indication message is sent by the SGW according to an indication of a Mobility Management Entity, MME.

5. A session management function entity, comprising a processor and a memory;
   wherein the processor is configured to read a program in the memory to:
   determine that a User Equipment, UE, moves from a first network to a second network after receiving a request message for updating session management context of the UE;
   notify a user plane function entity to delete a user plane connection of the UE in the first network and notify the user plane function entity to create a user plane connection of the UE in the second network, so that the user plane function entity transmits downlink data of the UE through the user plane connection created in the second network; and
   determine that a tunnel type used by the user plane connection in the second network is different from a tunnel type used by the user plane connection in the first network after determining that the UE moves from the first network to the second network and before notifying the user plane function entity to delete the user plane connection of the UE in the first network and notifying the user plane function entity to create the user plane connection of the UE in the second network.

6. The session management function entity of claim 5, wherein the first network is an Evolved Packet System, EPS, network and the second network is a 5G network.

7. The session management function entity of claim 6, wherein the processor is further configured to:
   determine that the UE moves from the first network to the second network after receiving the request message sent by an Access and Mobility Management Function, AMF, entity; or
   determine that the UE moves from the first network to the second network according to an EPS bearer identifier sent by the AMF entity.

8. The session management function entity of claim 6, wherein the processor is further configured to:
   determine that the second network does not support a tunnel type used by the user plane connection in the first network before notifying the user plane function entity to delete the user plane connection of the UE in the first network; or
   receive a first indication message for indicating to delete the user plane connection of the UE in the first network sent by an AMF entity before notifying the user plane function entity to delete the user plane connection of the UE in the first network; or
   receive a second indication message for indicating to delete the user plane connection of the UE in the first network sent by a Serving GateWay, SGW, before notifying the user plane function entity to delete the user plane connection of the UE in the first network; wherein the second indication message is sent by the SGW according to an indication of a Mobility Management Entity, MME.

9. A non-transitory computer storage medium, storing a computer program thereon, wherein the computer program is executed by a processor to:
   determine that a User Equipment, UE, moves from a first network to a second network after receiving a request message for updating session management context of the UE;
   notify a user plane function entity to delete a user plane connection of the UE in the first network and notify the user plane function entity to create a user plane connection of the UE in the second network, so that the user plane function entity transmits downlink data of the UE through the user plane connection created in the second network; and
   determine that a tunnel type used by the user plane connection in the second network is different from a tunnel type used by the user plane connection in the first network after determining that the UE moves from the first network to the second network and before notifying the user plane function entity to delete the user plane connection of the UE in the first network and notifying the user plane function entity to create the user plane connection of the UE in the second network.

10. The non-transitory computer storage medium of claim 9, wherein the first network is an EPS network and the second network is a 5G network.

11. The non-transitory computer storage medium of claim 10, wherein the computer program is further executed by the processor to:
   determine that the UE moves from the first network to the second network after receiving the request message sent by an Access and Mobility Management Function, AMF, entity; or
   determine that the UE moves from the first network to the second network according to an Evolved Packet System, EPS, bearer identifier sent by the AMF entity.

12. The non-transitory computer storage medium of claim 10, wherein the computer program is further executed by the processor to:
   determine that the second network does not support a tunnel type used by the user plane connection in the first network before notifying the user plane function entity to delete the user plane connection of the UE in the first network; or
   receive a first indication message for indicating to delete the user plane connection of the UE in the first network sent by an AMF entity before notifying the user plane function entity to delete the user plane connection of the UE in the first network; or
   receive a second indication message for indicating to delete the user plane connection of the UE in the first network sent by a Serving GateWay, SGW before notifying the user plane function entity to delete the user plane connection of the UE in the first network; wherein the second indication message is sent by the SGW according to an indication of a Mobility Management Entity, MME.

* * * * *